T. B. FUNK.
DRAFT APPLIANCE FOR TRACTORS.
APPLICATION FILED MAY 3, 1916.
1,289,724.
Patented Dec. 31, 1918.
2 SHEETS—SHEET 1.
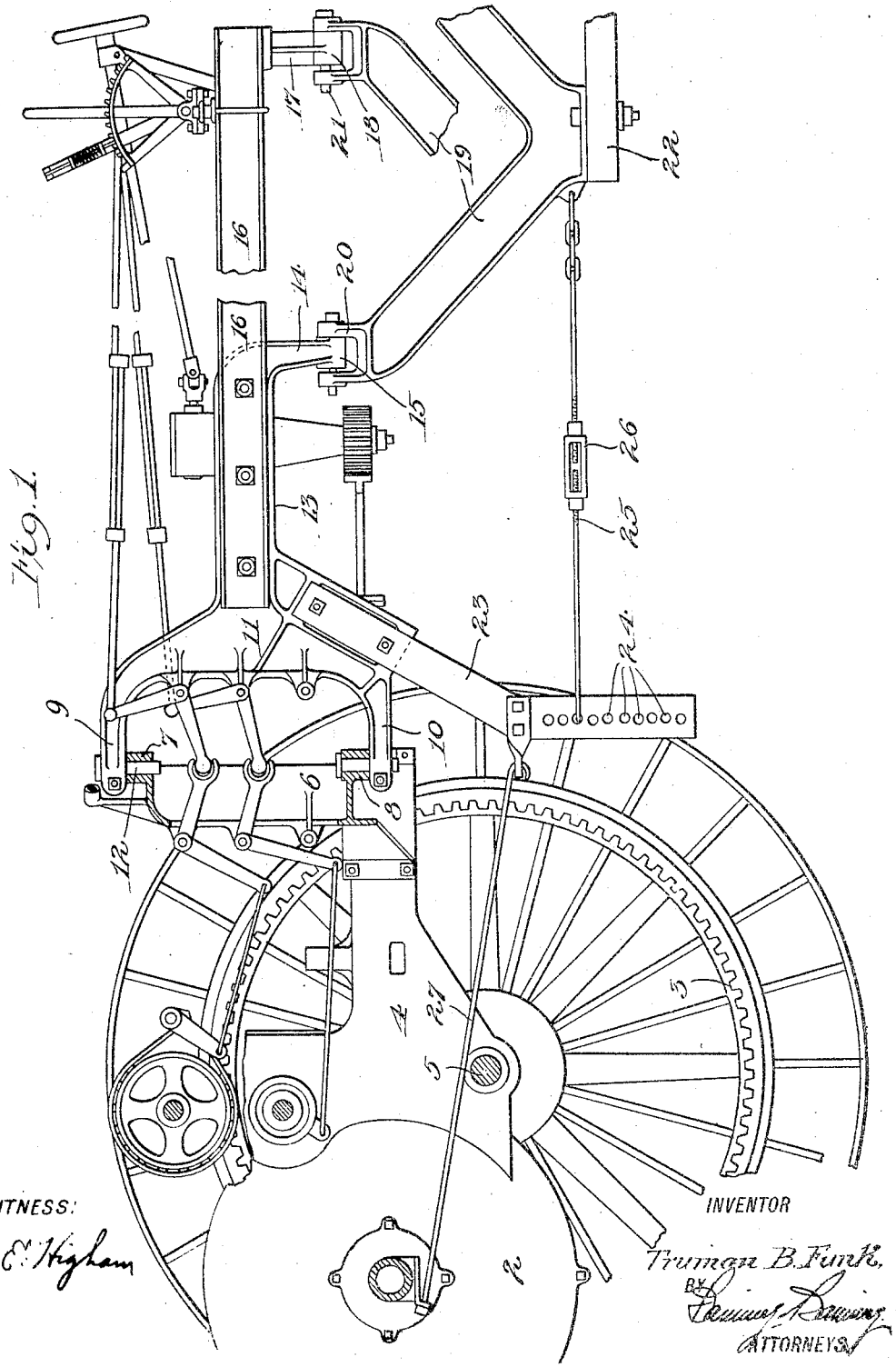

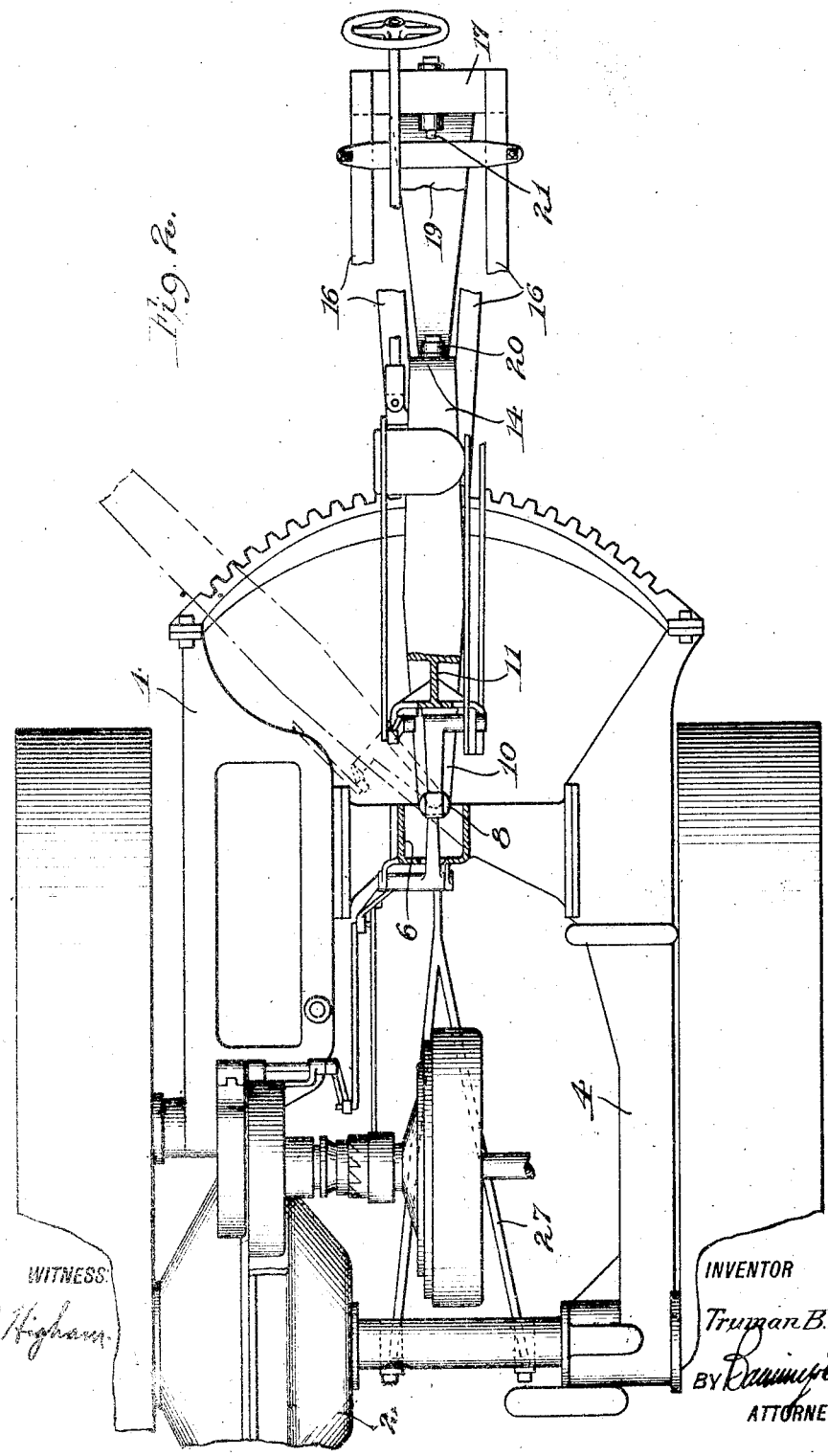

UNITED STATES PATENT OFFICE.

TRUMAN B. FUNK, OF MOLINE, ILLINOIS, ASSIGNOR TO MOLINE PLOW COMPANY, OF MOLINE, ILLINOIS, A CORPORATION OF ILLINOIS.

DRAFT APPLIANCE FOR TRACTORS.

1,289,724.  Specification of Letters Patent.  Patented Dec. 31, 1918.

Original application filed June 23, 1915, Serial No. 35,784. Divided and this application filed May 3, 1916. Serial No. 95,091.

*To all whom it may concern:*

Be it known that I, TRUMAN B. FUNK, a citizen of the United States, residing at Moline, in the county of Rock Island and State of Illinois, have invented certain new and useful Improvements in Draft Appliances for Tractors, of which the following is a specification, the same being a division of application Serial No. 35,784, filed June 23, 1915.

This invention relates to draft appliances designed for use in connection with a tractor of the kind now being extensively used for plowing and other agricultural purposes.

The object of the invention is to so design the draft appliances that they will fit a tractor for interchangeable use with plows, or other ground working implements, and so that adequate provision will be made for resisting the torque or the downward thrust of the rear end of the tractor, due to the operation of the engine, and so that the trailing implement may adapt itself by tilting or rocking on a horizontal axis to inequalities of the surface of the ground.

A further object of the invention is to so arrange the draft appliance that a low down draft connection below the axis of the wheels will be afforded, which better adapts the tractor for use in connection with most of the ground working implements for which it is intended. Further objects are to so construct the connections that they will be strong and durable, and at the same time well fitted for employment with a diverse line of implements.

Further objects and uses of the invention will appear from a detailed description of the invention which consists in the features of construction and combinations of parts hereinafter described and claimed.

In the drawing:

Figure 1 is a sectional view through the tractor, showing the draft appliance of the present invention in side elevation; and Fig. 2 is a top or plan view of the same.

The draft features constituting the present invention are applied to a tractor having tractor wheels 1 driven by means of an engine 2 and suitable gearing connections 3. The engine and associated parts are carried by a frame 4, and are preferably mounted in advance of the axle 5, so that the weight of the engine will in a measure counter-balance the weight of the draft appliances and assist the latter in overcoming the torque of the engine. The frame 4, at its rear end, terminates in a standard 6 provided, at its top and bottom, with pivot mountings 7 and 8 respectively, which latter receive the upper and lower ends 9 and 10 of a vertically arranged yoke 11, being pivoted to the mountings 7 and 8 by means of vertical pivot pins 12, or other suitable pivotal appliances. The vertical yoke 11 constitutes the bifurcated end of a Y-shaped casting, the stem 13 of which projects to the rear and terminates in a depending arm 14 provided, at its end, with a horizontal pivot bearing 15. The stem 13 of the yoke is channeled on each side, as shown, and receives the forward ends of a pair of beams 16 one on each side of the stem 13, and the beams, at their rear ends, diverge from one another, as shown in Fig. 2, and are connected, at the rear ends, to a bridge plate 17 provided on its under side in the center with a pivot bearing 18 in horizontal alinement with the pivot bearing 15, the arrangement being one which affords a very strong and rigid rearward connection for the draft appliances which particularly form the subject matter of the present invention.

The pivot bearings 15 and 18 afford mountings for the forward and rear ends of a draft yoke 19, the ends of which are bifurcated to embrace the pivot bearings 15 and 18 with which they are connected by means of horizontal pivots 20 and 21 respectively, the arrangement being one which maintains the draft yoke in rigid vertical alinement with the beams 16 and which permits a sufficient degree of lateral or tilting movement on a horizontal axis to compensate for the rocking or oscillating motions of the trailing implement, due to inequalities in the surface of the ground.

The draft yoke 19, in its center, is bolted or otherwise detachably connected with the tongue 22, pole, or other available front portion of a trailing implement, not shown, such as a plow, cultivator, harrow, or other device, with which the tractor is associated.

The yoke 11 is also channeled or otherwise fitted to receive the upper end of a draft bar 23, the lower end of which is provided with a series of holes 24 any one of which is adapted to furnish a connection for a draft rod 25 connected, at its rear end, with the draft yoke 19, and provided with a turn buckle, or the like, 26, for regulating the length of the draft rod to compensate for changes in its point of connection. The draft bar 23 is also, through forwardly extending draft connections 27, secured to the engine casing, or other available portion of the tractor, so as to afford the draft bar sufficient resistance to withstand the pull and strain to which it is subjected. The beams 16, in conjunction with the bridge plate 17, furnish a rear or articulated framework for the tractor and serve as a mounting for the controlling devices, but these features do not constitute a part of the present invention, and need not be described in detail.

The arrangement is one which affords a very rigid connection between the tractor and the trailing implement, which is important for the reason that the rear end of the tractor will be supported upon the trailing implement at a considerable distance from the tractor wheels, so that the connections must be of a character which will resist strains in a vertical direction and at the same time afford the horizontal tilting movement required in steering the tractor and in accommodating the tilting or tipping movements of the trailing implement in riding over rough ground.

The draft yoke 19 is employed in connection with low down machines, such as harrows, for instance, but for high draft machines, such as cultivators, hay rakes, etc., the yoke may be dispensed with and a connection made directly between the tongue or pole of the machine and the horizontal pivot mountings 15 and 19, in which case the draft rod 25 will likewise be dispensed with.

I claim:

1. In a machine of the character described, the combination of a front power unit, interchangeable trailing implements, a draft beam pivotally connected to the power unit at its forward end on a vertical axis to permit only lateral swinging motion, and a horizontal pivotal connection between the draft beam and the trailing implements, the draft beam extending over the horizontal pivot.

2. In a machine of the character described, the combination of a front power unit, interchangeable trailing implements, a draft beam pivotally connected to the power unit at its front end on a vertical axis to permit only lateral swinging motion, and longitudinal pivotal connections between the draft beam and the trailing implements extending forwardly and rearwardly from the end of the latter.

3. In a machine of the character described, the combination of a front power unit, a rearwardly extending draft beam pivotally connected therewith at its forward end on a vertical axis to permit lateral swinging motion, and a longitudinal pivotal connection carried by the draft beam and adapted to pivotally connect the latter with the underlying front portion of a trailing implement, a draft bar downwardly extending from the draft beam, and a draft rod rearwardly extending therefrom and affording means for imparting draft to the trailing implement at a point below the longitudinal pivotal mounting therefor, substantially as described.

4. In a machine of the character described, power mechanism, a draft beam pivotally connected therewith to permit lateral swinging motion, a draft yoke pivoted to said draft beam on a horizontal axis, means for connecting a trailing implement to said draft yoke, a draft rod connected with said yoke at a point below its pivot mounting, a depending draft bar fitted for adjustable connection of the draft rod, and a connection between the draft bar and the forward portion of the mechanism for imparting the draft therethrough, substantially as described.

5. In a machine of the character described, the combination of a front power unit, a rearwardly extending draft beam pivotally connected therewith at its forward end on a vertical axis to permit lateral swinging motion, and front and rear longitudinal pivotal connections carried by the draft beam and adapted to pivotally connect the latter with the underlying front portion of a trailing implement, a draft bar downwardly extending from the draft beam, and a draft rod rearwardly extending therefrom and affording means for imparting draft to the trailing implement at a point below the longitudinal pivotal mounting therefor, substantially as described.

6. In a machine of the character described, a wheeled power mechanism, a draft beam swivelly connected to said power mechanism by a vertical pivot, means for connecting an implement to said beam consisting in part of a yoke pivotally connected with said draft beam by longitudinal pivots, a draft bar downwardly extending from the draft beam, a connection between said draft bar and said yoke, and a connection from the power mechanism to said draft bar below the axial line of said power mechanism, substantially as described.

7. In a machine of the character described, a wheeled power mechanism consisting in part of a pivot standard, a vertically disposed yoke pivoted at its upper and lower ends to the pivot standard and adapted to swing laterally, a draft beam rigidly connected to said yoke and extending rearwardly therefrom, a draft bar depending from said yoke, and provided at its lower end for adjustable connection, a draft yoke having its forward and rear ends pivoted in horizontal alinement below the draft beam, means for detachably connecting a trailing implement to said yoke, a draft rod having its rear end connected to said yoke and its forward end adjustably connected to the draft bar, and a connection between the draft bar and the power mechanism, substantially as described.

8. In a machine of the character described, a wheeled power mechanism consisting in part of a pivot standard, a vertically disposed yoke pivoted at its upper and lower ends to the pivot standard and adapted to swing laterally and terminating at its rear end in a depending arm furnishing a horizontal pivot mounting, a pair of draft beams rigidly secured on opposite sides of the yoke and rearwardly extending therefrom, a bridge plate connecting the rear ends of said beams and provided with a pivot mounting in alinement with the arm, a yoke having its forward and rear ends pivoted to said pivot mountings, and a trailing implement connected to said yoke, substantially as described.

9. In a machine of the character described, a wheeled power mechanism consisting in part of a pivot standard, a vertically disposed yoke pivoted at its upper and lower ends to the pivot standard and adapted to swing laterally and terminating at its rear end in a depending arm furnishing a horizontal pivot mounting, a pair of draft beams rigidly secured on opposite sides of the yoke and rearwardly extending therefrom, a bridge plate connecting the rear ends of said beams and provided with a pivot mounting in alinement with the mounting on the arm, a yoke having its forward and rear ends pivoted to said pivot mountings, a trailing implement connected to said yoke, a draft bar depending from the vertically pivoted yoke, a draft rod connecting said bar with the horizontally pivoted yoke, and a connection between said bar and power mechanism, substantially as described.

10. In a machine of the character described, a wheeled power mechanism consisting in part of a pivot standard, a vertically disposed yoke pivoted at its upper and lower ends to the pivot standard and adapted to swing laterally and terminating at its rear end in a depending arm furnishing a horizontal pivot mounting, a pair of draft beams rigidly secured on opposite sides of the yoke and rearwardly extending therefrom, and a bridge plate connecting the rear ends of said beams and provided with a pivot mounting in alinement with the arm, substantially as described.

11. In a machine of the character described, a wheeled power mechanism consisting in part of a vertical pivot standard, a yoke vertically pivoted at its upper and lower ends to said standard and furnishing a rearwardly extending stem terminating in a depending arm fitted to receive a horizontal pivot, the stem being channeled on its sides, a pair of draft beams having their forward ends fitted within said channels and rigidly secured to the stem of the yoke, a bridge plate connecting the rear ends of the beams and fitted to furnish a mounting for a horizontal pivot in alinement with the pivot mounting afforded by the depending arm, and a connection for a trailing implement pivoted to the pivot mountings last mentioned, substantially as described.

12. In a machine of the character described, the combination of a front power unit, an interchangeable trailing implement associated therewith, a draft beam having its forward end vertically pivotally connected to the power unit at a point to the rear of the axial center of the power unit to permit the beam to have only lateral swinging motion, and a horizontal pivotal connection between the draft beam and the associated trailing implement, the draft beam extending over the horizontal pivot.

13. In a machine of the character described, the combination of a front power unit, an interchangeable trailing implement associated therewith, a draft beam having its forward end vertically pivotally connected to the power unit at a point to the rear of the axial center of the power unit to permit the beam to have only lateral swinging motion, and horizontal pivotal connections between the draft beam and the trailing implement, the draft beam extending over said horizontal pivots.

14. In a machine of the character described, the combination of a front power unit, an interchangeable trailing implement, a draft beam overlying the forward end of the trailing implement and pivotally connected to the power unit at its forward end on a vertical axis to permit only lateral swinging motion, and a horizontal pivotal connection between the draft beam and the underlying trailing implement.

15. In a machine of the character described, the combination of a front power unit, an interchangeable trailing implement, a draft beam overlying the forward end of the trailing implement and pivotally connected to the power unit at its forward end on a vertical axis to permit only lateral swinging motion, the pivotal point being to the rear of the axial center of the power unit, and a horizontal pivotal connection between the draft beam and the underlying trailing implement.

TRUMAN B. FUNK.

Witnesses:
L. C. BLANDING,
JAMES J. LAMB.